United States Patent [19]

Andoh

[11] Patent Number: 4,794,466
[45] Date of Patent: Dec. 27, 1988

[54] DISK PLAYER
[75] Inventor: Hiroshi Andoh, Saitama, Japan
[73] Assignee: Pioneer Electronic Corporation, Tokyo, Japan
[21] Appl. No.: 94,783
[22] Filed: Sep. 10, 1987
[30] Foreign Application Priority Data
Sep. 10, 1986 [JP] Japan .............................. 61-139134[U]
[51] Int. Cl.$^4$ .............................................. H04N 5/76
[52] U.S. Cl. ..................................... 358/335; 358/343; 358/342; 358/336
[58] Field of Search ............... 358/335, 342, 343, 336, 358/183, 148

[56] References Cited
U.S. PATENT DOCUMENTS
4,418,364 11/1983 Wine ..................................... 358/336
4,477,841 10/1984 Chen et al. ........................... 358/335
4,736,238 4/1988 Moriyama et al. ............. 358/314 X Primary Examiner—Michael L. Gellner
Assistant Examiner—D. Rutledge
Attorney, Agent, or Firm—Sughrue, Mion, Zinn, Macpeak & Seas

[57] ABSTRACT

A disk player having a character inserting circuit, a switch and a memory such that the player can selectively output a video signal from a recording disk directly, or selectively output a video signal which has previously been stored in a memory, and the character inserting circuit can, according to an instruction signal received from a system controller selectively insert a signal pattern into the video signal which corresponds to a character and/or numeral data.

1 Claim, 2 Drawing Sheets

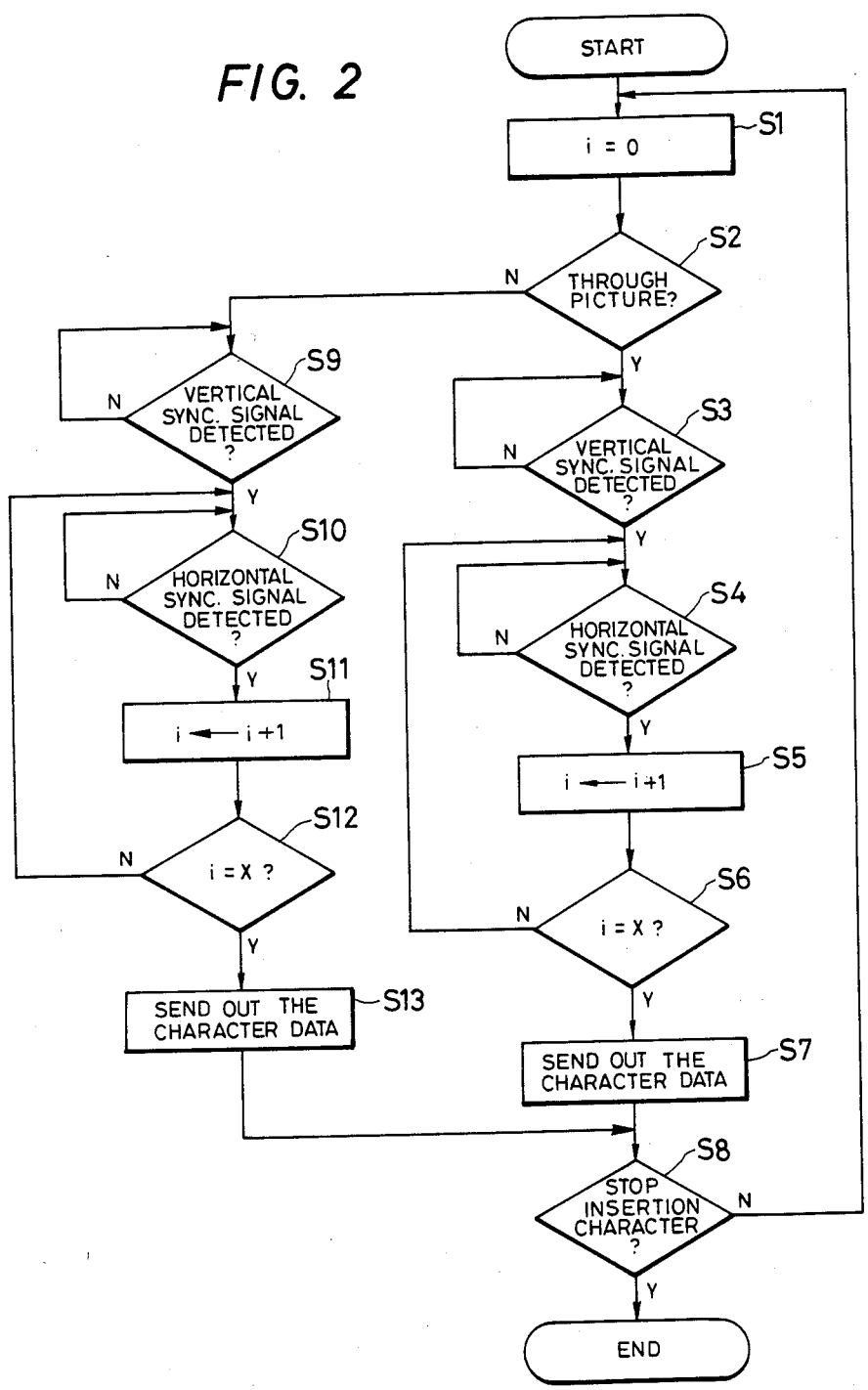

DISK PLAYER

BACKGROUND OF THE INVENTION

This invention relates to a disk player for reproducing data recorded on a recording disk.

Recording disks include CAV (constant angular velocity) disks and CLV (constant linear velocity) disks. In the case of a CAV disk, a predetermined amount of data such as a frame of video data has been recorded in each circumferential track coaxially arranged on the disk, and the parts of the tracks which are located between the frames and in which data corresponding to vertical synchronizing signals have been recorded are arranged on a straight line extended radially. Therefore, with a CAV disk, the synchronizing signals of video signals reproduced are regular in period even immediately after a jumping operation. That is, the CAV disk is suitable for a special picture reproduction such as a still picture reproduction.

On the other hand, in the case of a CLV disk, different amounts of data are recorded in different circumferential tracks; for instance, one frame of video data is recorded in the innermost circumferential track while three frames of video data is recorded in the outermost circumferential track. Therefore, with a CLV disk, the synchronizing signals of a video signal reproduced immediately after a jumping operation is irregular in period. In order to overcome this difficulty, a data reproducing device has been proposed in the art in which a video memory capable of storing one frame or field of video signals is provided, video signals are stored at predetermined positions in the video memory and are read out with an external stable clock signal.

It is desirable for the data reproducing device to be able to insert patterns such as characters and numerals including data such as frame numbers and chapter numbers not only in a picture reproduced by the video signal which is read from the disk and outputted as it is (without using the video signal which is read out of the video memory). In order to meet this requirement, it is necessary to provide a circuit for inserting a video signal corresponding to a pattern containing predetermined data in the video signal read out of the disk, and another circuit for inserting such a video signal in the video signal read out of the video memory. This will undoubtedly make the data reproducing device intricate in arrangement.

SUMMARY OF THE INVENTION

Accordingly, an object of this invention is to provide a disk player simple in construction in which a video signal can be inserted not only in the video signal which is read from a recording disk and outputted as it is but also in the video signal which is read out of the video memory.

The foregoing object and other objects of the invention have been achieved by the provision of a disk player for reproducing data recorded on a recording disk, which, according to the invention, comprises: memory means; memory control means for writing a video signal obtained from the disk in the memory means; signal selecting means for selectively outputting, in response to an instruction, a video signal obtained from the disk or a video signal read out of the memory means; and inserting means for inserting a video signal corresponding to a pattern containing predetermined data in the video signal outputted by the signal selecting means.

The nature, principle and utility of the invention will become more apparent from the following detailed description when read in conjunction with the accompanying drawings.

BRIEF DESCRIPTION OF THE INVENTION

In the accompanying drawings:

FIG. 1 is a block diagram showing the arrangement of one example of a disk player according to this invention; and FIG. 2 is a flow chart for a description of the operation of the disk player according to the invention.

DETAILED DESCRIPTION OF THE INVENTION

Figure 1:
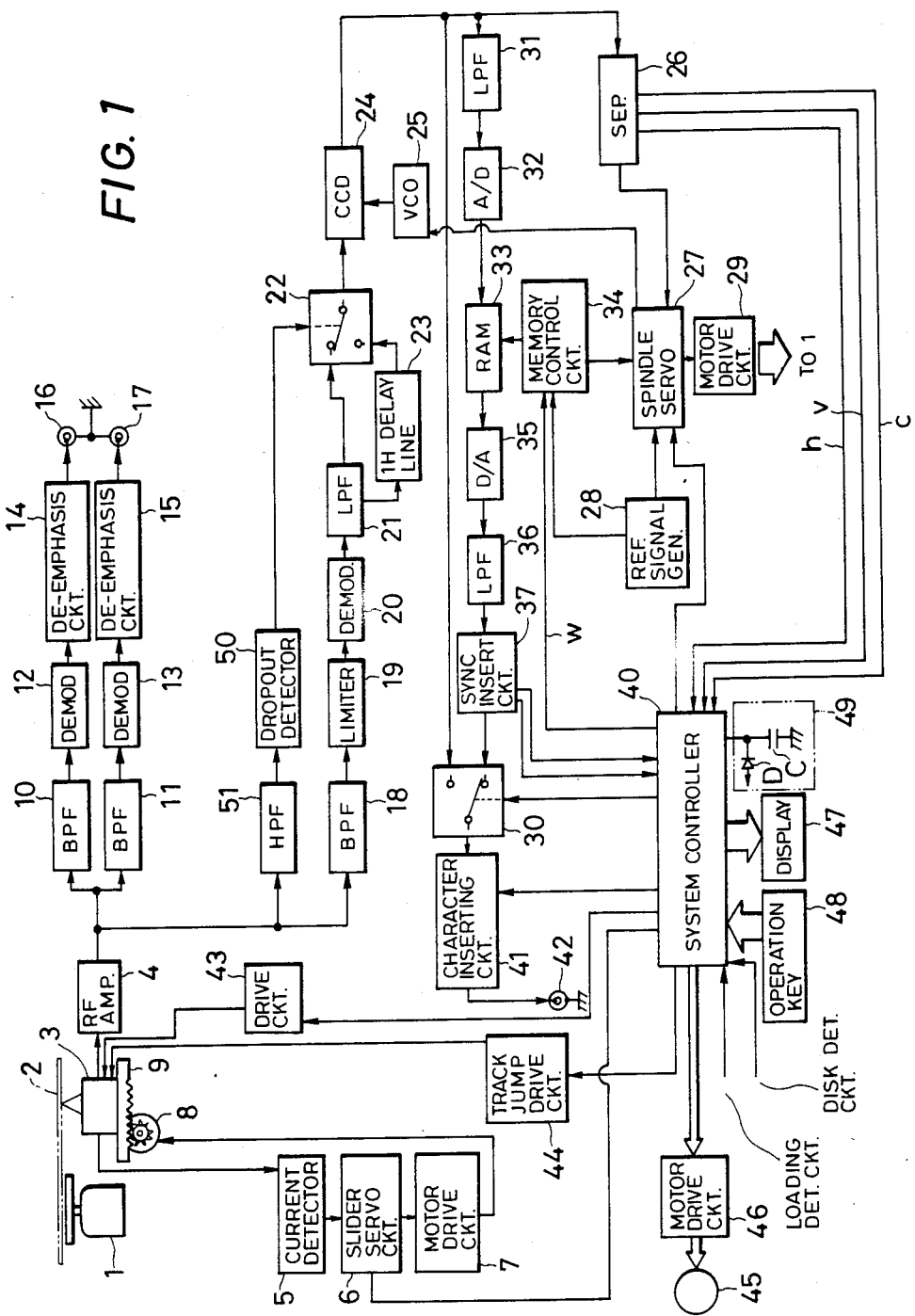

One example of a disk player according to the invention will be described with reference to the accompanying drawings.

As shown in FIG. 1, data recorded on a disk 2, which is driven by a spindle motor 1, is read by means of an optical pickup 3 incorporating a laser diode, an objective lens, a focus actuator, a tracking actuator and a phtodetector. The output of the optical pickup 3 is supplied to an RF amplifier 4, a focus servo circuit (not shown) and a tracking servo circuit (not shown). The focus servo circuit and the tracking servo circuit drive the focus actuator and the tracking actuator built in the pickup 3, so that the laser beam from the laser diode in the pickup 3 is focused on the recording surface of the disk 2, thus forming a data detecting light spot, while the position of the light spot is controlled radially of the disk 2 so that the light spot is positioned on a track formed in the recording surface of the disk 2.

A coil current is supplied to a coil for driving the tracking actuator of the pickup 3. The coil current is applied to a current detecting circuit 5. The circuit 5 outputs a current detection signal in accordance with the coil current. The current detection signal thus outputted is supplied to a slider servo circuit 6. In the circuit 6, the current detection signal is subjected to amplification and phase compensation. The output of the circuit 6 is applied to a motor drive circuit 7, which provides a drive signal for a slider motor 8. The slider motor 8 drives the slider 9, which supports the pickup 3 and is movable radially of the disk, so that the tracking actuator of the pickup 3 is positioned at the middle of its range of movement.

On the other hand, an RF signal outputted by the RF amplifier 4 is supplied to BPFs (band-pass filters) 10 and 11, as a result of which audio FM signals of right and left channels are extracted. These audio FM signals are supplied to FM demodulators 12 and 13, so that audio signals of the two channels are reproduced, respectively. These audio signals thus reproduced are supplied to de-emphasis circuits 14 and 15, respectively, where components emphasized during recording are restored in level. The audio signals outputted by the de-emphasis circuit 14 and 15 are supplied to audio output terminals 16 and 17, respectively.

The RF signal outputted by the RF amplifier 4 is supplied to a BPF 18, where a video FM signal is extracted therefrom. The video FM signal is applied to a limiter 19, where it is subjected to amplitude limitation. The output signal of the limiter 19 is applied to an FM demodulator 20, where a video signal is reproduced. The video signal is supplied through an LPF (low-pass filter) 21 to one terminal of a dropout compensating change-over switch 22, to the other terminal of which the video signal delayed by a 1 H (horizontal synchronizing period) delay line 23. A dropout detection signal outputted by a dropout detecting circuit 50 is supplied, as a control signal, to the change-over switch 22. The dropout detecting circuit 50 is supplied with a high frequency component of the RF signal which has been extracted by an HPF (high-pass filter) 51. The dropout detecting circuit 50 is so designed as to detect a dropout from the zero cross point of the high frequency component thereby to produce the dropout detection signal. The dropout detection signal controls the signal switching operation of the change-over switch 22, so that, in the event of a dropout, the video signal which is outputted by the change-over switch 22, corresponds to th video signal immediately prior to the dropout, i.e., the video signal immediately prior to the dropout is delayed by the 1 H delay line 23 one horizontal synchronizing period before it is supplied to the second input of the changover switch 22 and is selectively outputted for compensation of the dropout.

The output video signal of the change-over switch 22 is supplied to a CCD (charge coupled device) 24, to which a clock signal is supplied from a VCO (voltage-controlled oscillator). In the CCD, the video signal is delayed by a period of time corresponding to the frequency of the clock signal. The output video signal of the CCD is supplied to a separating circuit 26. The separating circuit 26 is so designed as to separate horizontal and vertical synchronizing signals and control data such as Philips codes from the video signal. The horizontal synchronizing signal outputted by the separating circuit 26 is supplied to a spindle servo circuit 27. In the circuit 27, the horizontal synchronizing signal is compared in phase with a reference signal having a predetermined frequency which is provided by a reference signal generating circuit 28, and a spindle error signal corresponding to the phase difference between the two signals is formed. The spindle error signal is applied to a motor drive circuit 29 to control the speed of the spindle motor 1. At the same time, a control signal corresponding to the phase difference between the horizontal synchronizing signal and the reference signal is formed so as to be applied to the control input terminal of the VCO 25. As a result, the oscillation frequency of the VCO 25 corresponds to the phase difference between the two signals, so that the signal delay time of the CCD 24 changes with the phase difference; that is, the time axis error of the video signal is eliminated.

The video signal, the time axis error of which has been eliminated by the CCD 24, is supplied to one input terminal of a change-over switch 30 and is supplied to one input terminal of a change-over switch 30 and is supplied through an LPF (low-pass filter) 31 to an A/D (analog-to-digital) converter 32. In the A/D converter 32, the video signal is sampled at a predetermined period to provide digital data. The output data of the A/D converter 32 is supplied to a video memory, namely, a RAM 33. The address control and the mode control of the RAM 33 are carried out by a memory control circuit 34. The memory control circuit 34 is so designed that data stored in the addresses in the RAM 33 are sequentially read with the aid of a clock signal provided by the reference signal generating circuit 28, and the contents of the addresses in the RAM 33 are rewritten in response to a write enable signal. The data read out of the RAM 33 is supplied to D/A (digital-to-analog) converter 35 so as to be converted into an analog signal. The output of the D/A converter 35 is supplied through an LPF 36 to a sync insert circuit 37, where a synchronizing signal is added to it to reproduce the video signal. The circuit 37 has a terminal for outputting a video signal, and a terminal for outputting horizontal and vertical synchronizing signals which are added to the output of the D/A converter 35. The output video signal of the sync insert circuit 37 is supplied to the other input terminal of the change-over switch 30, to which a switching control signal is applied by a system controller 40. Character data can be added to the video signal applied to the change-over switch 30 through the RAM 33 or the video signal applied to the switch 30 directly from the CCD 24 using a character inserting circuit 41. The character inserting circuit 41 is so designed as to insert a video signal corresponding to a pattern such as a character, which is indicated by output data of the system controller 40, into the video signal outputted by the change-over switch 30. The video signal outputted by the character inserting circuit 41 is supplied to a video output terminal 42.

The system controller 40 is made up of a microcomputer including a processor, ROM and RAM. The system controller 40 receiving synchronizing signals and control data from the separating circuit 26, synchronizing signals from the sync insert circuit 37, data corresponding to the key operation of an operating keyboard 48, and a loading detection signal and disk detection signal from a loading mechanism (not shown). In the system controller 40, the processor processes input signals according to a program stored in the ROM, thereby to control the slider servo circuit 6, the spindle servo circuit 27, the change-over switch 30, the memory control circuit 34, the character inserting circuit 41, a drive circuit 43 for driving the laser diode, a track jump drive circuit 44 for driving the tracking actuator in response to a jump instruction, a motor drive circuit 46 for driving a motor 45 in a disk loading mechanism, and a display circuit 47. A power source Vcc is connected through a diode D to the power terminal of the system controller 40. The power terminal of the system controller 40 is grounded through a capacitor C. The diode D and the capacitor C form a backup circuit 49, so that the system controller 40 is maintained energized even in a power failure.

The operation of the processor in the system controller 40 will be described with reference to a flow chart in FIG. 2.

When a picture display key or the like is operated to issue a character insertion instruction while a play operation is carried out, i.e., the data recorded on the disk 2 are being read with implementation of a main routine or a sub-routine for controlling the play operation, step S1 is effected so that the content of a predetermined address (generically represented by the character "i") in the RAM of the system controller 40 is reset (or zeroed). Next, in step S2, it is determined whether or not the output video signal of the CCD 24 is selected by the change-over switch 30, i.e, whether a "through" picture reproduction is being carried out. When in step S2 it is determined that the "through" picture reproduction is carried out, step S3 is affected. In step S3, it is determined whether or not the separating circuit 26 is outputting the vertical synchronizing signal v. In the case where in step S3 it is determined that separating circuit outputs no vertical synchronizing signal v, the operation of step S3 is carried out again. That is, only when it is determined that the vertical synchronizing signal v is outputted, step S4 is effected.

In step S4, the processor determines whether or not the horizontal synchronizing signal h is being outputted by the separating circuit. If in step S4 it is determined that the horizontal synchronizing signal h is not being outputted, then the operation of step S4 is carried out again. That is, step 5 is effected, only when it is determined that the horizontal synchronizing signal h is outputted. In step S5, a value of one (1) is added to the content of the predetermined address i in the RAM of the system controller 40. Under this condition, step S6 is effected to determine whether or not the content of the predetermined address in the RAM of the system controller is equal to a predetermined value X. If the content is not equal to the value X, then step S4 is effected again. When in step S6 it is determined that the content of the predetermined address in the RAM of the system controller 40 is equal to the value X, then step S7 is effected. In step S7, data indicating a frame number, a chapter number, etc. which is obtained from the output control data signal c of the separating circuit 26 is supplied to the character inserting circuit 41.

Thereafter, step S8 is effected. In step S8, the processor determines whether or not a character insertion stopping instruction is issued. If in step S8 it is determined that no character insertion stopping instruction is issued, then step S1 is effected again. When in step S8 it is determined that the character insertion stopping instruction is issued, the above-described processor operation is ended.

When in step S2 it is determined that the "through" picture reproduction is not being carried out, step S9 is effected. In step S9, the processor determines whether or not the vertical synchronizing signal is being outputted by the sync insert circuit 37. If in step S9 it is determined that no vertical synchronizing signal is outputted by the sync insert circuit 37, step S9 is effected again. Only when it is determined that the vertical synchronizing signal is outputted by the sync insert circuit 37, step S10 is effected.

In step S10, the processor determines whether or not the horizontal synchronizing signal is being outputted by the sync insert circuit 37. If in step S10 it is determined that no horizontal synchronizing signal is outputted, step S10 is effected again. Only when it is determined that the horizontal synchronizing signal is outputted by the sync insert circuit 37, step S11 is effected. In step S11, a value of one (1) is added to the content of the predetermined address i in the RAM of the system controller 40. Thereafter, step S12 is effected, in which it is determined whether or not the content of the predetermined address i in the RAM of the system controller 40 is equal to the predetermined value X. It in step S12 it is determined that the content is not equal to the value X, then step S10 is effected again. When in step S12 it is determined that the content of the predetermined address in the RAM of the system controller 40 is equal to the value X, then step S13 is effected. In step S13, data indicating a frame number, a chapter number, etc which is obtained from the output control data signal c of the separating circuit 26 is supplied to the character inserting circuit 41. Thereafter, step S8 is effected.

Thus, when a "through" picture reproduction is effected, i.e., when the output video signal from the CCED is being outputted through the change-over switch 30 directly and is being supplied to the output terminal 42, the characters are inserted in the predetermined part of the picture in synchronization with the horizontal and vertical synchronizing signals outputted by the separating circuit 26. When, on the other hand, a memory picture reproduction is being carried out, i.e., when the video signal which is read out of the RAM 33 is supplied through the change-over switch 30 to the output terminal 42, the characters are inserted in the predetermined part of the picture in synchronization with the horizontal and vertical synchronizing signals from the sync insert circuit 37.

As was described above, in the disk player of the invention, a video signal corresponding to a pattern including predetermined data is inserted in a video signal outputted by signal selecting means which is adapted to selectively output a video signal read from a recording disk or a video signal read out of memory in accordance with an instruction. That is, in the disk player of the invention, with the aid of a simple circuit including a single character inserting circuit, a pattern such as characters and numerals (including data such as frame numbers and chapter numbers), can be inserted not only in a picture reproduced by the video signal which is read from a recording disk and outputted directly, but also in a picture reproduced by a video signal which is read out of a video memory.

What is claimed is:

1. A disk player for reproducing data recorded on a recording disk, which comprises:
   memory means;
   memory control means for writing a video signal obtained from said recording disk into said memory means, and reading out a video signal written in said memory means;
   signal selecting means for selectively outputting, in response to an instruction, a video signal obtained from said recording disk or a video signal read out of said memory means; and
   inserting means for inserting a video signal corresponding to a pattern containing predetermined data into said video signal outputted by said signal selecting means.

* * * * *